[19] United States Patent
Rood et al.

[11] Patent Number: 4,473,595
[45] Date of Patent: Sep. 25, 1984

[54] LOW-SODIUM SALT SUBSTITUTE

[76] Inventors: Robert P. Rood, 5341 Calvin Ave., Tarzana, Calif. 91356; Sarko M. Tilkian, 17643 Rancho St., Encino, Calif. 91316

[21] Appl. No.: 525,690

[22] Filed: Aug. 23, 1983

Related U.S. Application Data

[63] Continuation-in-part of Ser. No. 336,786, Jan. 4, 1982, abandoned.

[51] Int. Cl.$^3$ .............................................. A23L 1/237
[52] U.S. Cl. .................................................... 426/649
[58] Field of Search ......................................... 426/649

[56] References Cited

U.S. PATENT DOCUMENTS

| | | | |
|---|---|---|---|
| 2,471,144 | 5/1949 | Davy | 426/649 |
| 3,505,082 | 4/1970 | Miller | 426/649 |
| 3,514,296 | 5/1970 | Frank et al. | 426/649 |
| 4,243,691 | 1/1981 | Mohlenkamp et al. | 426/649 |

*Primary Examiner*—Joseph M. Golian
*Attorney, Agent, or Firm*—Philip D. Junkins

[57] ABSTRACT

A low-sodium seasoning composition adapted as a substitute for common table salt and as a magnesium dietary supplement comprised of from about 40 to about 50 weight percent of sodium chloride in admixture with from about 25 to about 35 weight percent of potassium chloride and from about 15 to about 25 weight percent of magnesium salt, including magnesium sulfate or magnesium chloride. The particular low-sodium salt substitute formulation results in a synergistic or enhanced saltiness taste per unit weight through the combination of the sodium and potassium salts without any potassium-generated bitterness or bitter after-taste sensation because of the presence of magnesium salt which masks or overcomes such bitterness or after-taste while providing desirable magnesium dietary supplementation. Thus, it has been found that only about 70 to 90% of the unit weight of table salt required to obtain a level of saltiness taste is required for the low-sodium salt substitute composition to obtain the same level of saltiness taste. Use of the proposed low-sodium salt substitute results in a reduction of sodium intake of greater than 50% with respect to table salt in the attainment of an equivalent level of saltiness taste.

3 Claims, No Drawings

LOW-SODIUM SALT SUBSTITUTE

This application is a continuation-in-part of our copending U.S. application Ser. No. 06/336,786, filed on Jan. 4, 1982, now abandoned entitled "Low-sodium Salt Substitute," now abandoned.

BACKGROUND OF THE INVENTION

1. Field of the Invention

The present invention relates to a substitute for common table salt (sodium chloride, NaCl) and more particularly to a low-sodium food flavoring composition for promoting a full salty seasoning taste for foods and in food cooking and as a magnesium dietary supplement. The composition of this invention is primarily useful as a food seasoning salt substitute to be used in those instances where sodium in the diet must be reduced. The composition, while having a full salty taste equivalent to ordinary table salt, is not bitter, does not leave a disagreeable aftertaste and can be used in food cooking without changes in the composition.

It is well known that in certain cardiac and renal conditions, particularly when associated with endema, hypertension, arteriosclerosis, pregnancy complications and epilepsy, the diet must be relatively salt-free in order to avoid further damage and to ameliorate these conditions to the degree that control of diet can do so. It is further known that the deleterious action of common table salt is due to the sodium content thereof, since it is the sodium in the form of sodium ions which must be specifically avoided. Since this robs the diet of a good deal of palatability, many cardiac and renal disease patients continue to use table salt even though it should not be used by them. Consequently, continued or further damage results or such patients fail to obtain alleviation of their condition. Further, the tendency of the sodium content in the diet to cause an accumulation of fluids with a corresponding increase in the weight of the body tissues has emphasized the importance of reducing the sodium intake in reducing diets.

Salt hunger, or the desire for salt, seems to be a primary instinct of man which is shared by many animals. It is an important part of the taste sense or taste pattern of most all people. Food without salt is substantially tasteless, flat, and unpalatable. Thus, the necessity for adhering to a low salt or saltless diet imposes a very genuine hardship on persons suffering from such pathological conditions. Added to this sensuous hardship may be an impairment of health by reason of the fact that unpalatable food is not as easily ingested as that which is enjoyed.

Many attempts have been made to provide salty tasting compositions as a substitute for table salt which will give the same or a similar seasoning effect and which are comprised of substantially reduced quantities of sodium chloride. To this end potassium chloride, ammonium chloride and similar compounds have been suggested. The use of these chlorides, and combinations of them, leaves much to be desired as to taste. Neither of them individually or in combinations tastes like sodium chloride. Each alone has a disagreeable taste as do mixtures of same. Potassium chloride has a strong "aftertaste" which is usually characterized as "bitter" by most people. Ammonium chloride also has a bitter after-taste, and (in addition) when ingested disturbs the acid-base balance in the blood, produces acidosis and stimulates bronchial mucosa causing excess mucosus secretion and coughing. Ammonium chloride must be eliminated by the body as urea thus taxing the functions of the liver and the kidneys. Further, at cooking and baking temperatures ammonium chloride decomposes thereby changing the pH value, taste and other properties of the food containing it and being cooked or baked. It has been suggested that minor amounts of magnesium, calcium, formates and citrates be utilized in salt substitute compositions composed primarily of potassium chloride to mask or overcome the bitter taste of this chloride. One drawback inherent in the use of these additives is that the true salty or zesty flavor or taste sensation associated with salt is lost or impaired. Another drawback is that many of these additives stratify or segregate due to the dissimilarity in crystal structure and density between the additive and the sodium chloride, potassium chloride and/or ammonium chloride components of the composition.

2. Description of the Prior Art

There have been numerous formulations prepared and compositions proposed to aid in reducing or eliminating to a substantial degree the sodium intake. Some formulations completely eliminate sodium chloride, but seek to retain the "salty" taste associated with sodium chloride (common table salt) since the taste sense appears to be a primary need, drive or desire built into man throughout his evolution. These formulations, while reducing or eliminating sodium chloride from the diet of man from the seasoning standpoint, have been largely unsuccessful in satisfying the principal hunger and taste desire man appears to have for the saline taste of salt.

A number of U.S. patents disclose and claim inventions relating to sodium-free substitutes. In U.S. Pat. No. 2,471,144, issued to E. D. Davy and entitled "Salt Substitute," a sodium-free preparation containing chlorides of potassium and ammonium as the primary saline constituents (70-95% of the total ingredients) with the addition of small amounts of calcium and magnesium cations and citrate and formate anions is proposed as a salt substitute. The small amounts of magnesium, calcium, formate and citrate ions are included in the preparation to "smooth out" the taste to make the preparation taste similar to that of sodium chloride. In U.S. Pat. No. 2,596,333, issued to A. Halpern et al and entitled "Dietary Salt Substitute," the claimed product contains potassium chloride particles (70-85% by weight) with a coating comprising an inert binder (gum or starch) and a glutamic acid compound (glutamic acid, potassium glutamate and calcium glutamate). The glutamic acid compound is used to mask the bitter taste of the potassium chloride particles.

In U.S. Pat. No. 2,601,122, issued to L. Freedman and entitled "Saline Composition," it is acknowledged that the sodium-free salts proposed to replace common table salt (including principally potassium chloride and ammonium chloride components), while having a saline taste, have certain taste disadvantages such as "metallic" or "bitter" after-taste. Freedman, therefore, proposes to add to sodium-free compositions consisting primarily of chlorides of potassium and ammonium a salt of choline to overcome the bitterness normally associated with such chlorides and a caking retardant (a stearate, a starch or a tricalcium phosphate). G. C. Perri and K. Ladenberg in their U.S. Pat. No. 2,824,008, entitled "Salt Substitute," disclose and claim a sodium-free composition comprising, by weight, 45-55 parts of potassium chloride, 30-40 parts of dipotassium succinate, and about 10–20 parts of dipotassium fumarate. The fumarate and succinate act to mask the bitter aftertaste usually accompanying the use of potassium chloride.

A further sodium-free "Salt Substitute Composition" has been disclosed and claimed in U.S. Pat. No. 3,505,083 by H. C. Miller. The composition is comprised of about 80–99% by weight of potassium chloride and from about 1–20% by weight of fumaric acid. The bitter after-taste of potassium chloride is allegedly overcome by the fumaric acid component of the composition. A commercial version of this sodium-free composition is marketed by Morton Salt Company as "Morton Salt Substitute." Most recently U.S. Pat. No. 4,216,244, entitled "Low Sodium Salt Substitute," has been issued to A. E. Allen, Jr. (deceased) and proposes a salt seasoning product having potassium chloride as its major ingredient (92%) with buffers, flavor enhancers and a suitable anti-caking agent. Still more recently U.S. Pat. No. 4,243,691 entitled "Sodium-free Salt Substitute" has issued to M. J. Mohlenkamp, Jr. and G. D. Hiler and discloses a sodium-free salt substitute containing nucleotides, an amino acid mixture, a sugar, a potassium phosphate and about 15% to about 50% by weight of potassium chloride.

In the past, efforts have also been made to provide a low-sodium seasoning salt by the substitution of potassium chloride for part of the sodium chloride in the salt product. Past commercial efforts to provide a low-sodium salt have involved various combinations of flavoring, flavor enhancers and buffers with the potassium chloride together with suitable free-flow agents. In U.S. Pat. No. 2,742,366, issued to R. M. Power and entitled "Salt Substitute and Method of Preparing Same," it is proposed that a low-sodium salt substitute contain between 50% and 70% by weight of potassium chloride, between 15% and 35% by weight of sugar, between 1% and 10% by weight of monocalcium glutimate, and up to 5% (based upon total weight of the salt substitute) of sodium chloride.

R. L. Frank et al in their U.S. Pat. No. 3,514,296 (Reissue No. 27,981), entitled "Salt Substitute," have disclosed a low-sodium salt substitute comprised of 20 to 80% by eight of potassium and 80 to 20% by weight of sodium chloride. The inventors aver that such salt composition provides for 80% of the population a saltiness taste greater than an equal quantity of sodium chloride component (alone) of the composition. The commercial version of the patented product is sold under the name "Lite-Salt" by the Morton Salt Company and contains 50% potassium chloride and 50% sodium chloride.

Another low-sodium salt product is disclosed and claimed in U.S. Pat. No. 4,068,006, issued to G. J. Moritz and entitled "Salt Seasoning Mixture." The principal ingredients of the mixture are sodium chloride (±–65% by weight), potassium chloride and citric acid granules, the latter being encapsulated with a non-toxic substance such as gelatin, cellulose wax or hydrogenated vegetable oil. The citric acid acts as an agent for masking the bitter taste of the potassium chloride but, according to the inventor, requires encapsulation to overcome the delinquescence nature of citric acid to avoid "caking" of the mixture.

In U.S. Pat. No. 4,107,346, issued to H. L. Kravitz and entitled "Dietary Salt Compositions," a salt composition is proposed which is comprised of the basic mineral element cations, sodium (92–93.1%), potassium (2.4–3.4%), calcium (3.1–3.4%) and magnesium (1.2–1.4%) together with one or more trace elements essential to the human diet.

OBJECT OF THE INVENTION

There is now convincing evidence that chronic sodium excess leads to an increased incidence of hypertension, morbidity, and mortality in virtually all mammalian species. Population areas with very high salt intakes have a high incidence of hypertension. Areas with low salt intake, less than 4 grams of NaCl daily, have a very low incidence of hypertension and blood pressure does not rise with advancing age. Thus, it has been suggested that the epidemic of hypertension in industrialized countries could be prevented if the mean sodium intake would be decreased.

There is also strong evidence suggesting that potassium exerts a protective effect against the toxicity of sodium. It has been suggested that potassium may be an important determinant of the blood pressure raising effect of sodium. The exact mechanisms by which potassium exerts a protective effect against toxicity of sodium are still unknown. Potassium seems to promote the excretion of sodium and this may, to some extent, explain its beneficial effects.

It has been reported that regional death rates from cardiovascular diseases are inversely related to the hardness (and thus the mineral content) of the local drinking water. Magnesium in the hard water may be accounting for this protective effect. Further, it has been stated that magnesium is not found in modern food in sufficient amounts to satisfy daily requirements. Magnesium supplementation has been reported to protect against cardiovascular damage and arrhytmias, both in animals and in man. The daily magnesium requirements are 300 to 500 milligrams per day, but the daily intake in industrialized countries is only about 250 milligrams.

A marked reduction in sodium consumption is recommended for the prevention and treatment of arterial hypertension. The American Heart Association has recommended that the average intake of salt (sodium chloride) should be reduced to about one-third of the current U.S.A. level of about 12 grams per day. Partial replacement of sodium chloride by potassium chloride in salt substitutes has been discussed above. As previously indicated, a decrease in the sodium to potassium ratio in population diets apparently results in lower blood pressure levels and decreased mortality. Since the modern diet is too low in magnesium, and magnesium supplementation protects against cardiovascular damage and cardiac arrhythmias, the addition of magnesium to salt is a convenient way to increase the level of magnesium intake.

Accordingly, it would therefore be desirable to provide a low-sodium salt substitute composition containing sodium chloride (in sufficient amount to promote a normal salty taste), potassium chloride (in sufficient amount to provide a protective effect against the toxicity of sodium), and magnesium (in sufficient amount to mask or overcome the bitter taste of potassium and to supplement the otherwise low dietary supply of magnesium).

It is an object of the present invention to provide a novel highly palatable low-sodium substitute for table salt containing potassium chloride and magnesium which retains the salty taste associated with sodium chloride.

It is another object of the present invention to provide a low-sodium substitute for table salt which is highly palatable and which, although containing potassium chloride as a major constituent, does not have a bitter after-taste.

It is a further object of the present invention to provide a low-sodium dietary composition which is readily substitutable for table salt and which retains the zesty and salty taste associated with pure sodium chloride although a principal constituent of the composition is potassium chloride which itself normally promotes a bitter after-taste in salt substitution compositions.

It is a still further object of the present invention to provide a highly palatable low-sodium substitute for table salt, containing potassium chloride and a magnesium salt as major constitutents, which has the zesty and salty taste associated with pure sodium chloride but does not have a bitter after-taste normally associated with salt substitutes containing potassium chloride.

Still another object of the present invention is to provide a highly palatable low-sodium dietary food seasoning composition (containing potassium chloride and a magnesium salt as major constituents) which is readily substitutable for table salt and which resists segregation or stratification of its constituents during storage, agitation or handling.

A still further object of the invention is to provide a highly palatable dietary food seasoning substitute for table salt containing as constituents sodium chloride, potassium chloride and a magnesium salt in a constituent ratio combination such that the resulting seasoning substitute retains the zesty and salty taste associated with pure sodium chloride and does not result in a bitter after-taste normally associated with salt substitutes containing potassium chloride.

Another object of the invention is to provide a highly palatable dietary food seasoning substitute for salt which meets the needs of patients on a low-sodium diet and assists those on a high potassium diet and which is not bitter to the taste when either used directly on ready-to-eat foods or on and in foods being prepared.

The fullfillment of these and other objects of the present invention will be more readily appreciated from the following summary and therafter a detailed description of the invention (including examples) together with the appended claims.

SUMMARY OF THE INVENTION

The above objectives are achieved by providing a seasoning salt composition which comprises from about 40 to about 50 weight percent of sodium chloride in admixture with from about 25 to about 35 weight percent of potassium chloride and from about 15 to about 25 weight percent of a magnesium salt, including magnesium sulfate or magnesium chloride. In the preferred embodiment of the present invention the composition comprises about 45 to about 50% by weight of sodium chloride (NaCl), about 30 to about 35% by weight of potassium chloride (KCl), and about 15 to about 25% by weight of magnesium sulfate ($MgSO_4.7H_2O$). The preferred embodiment of the low-sodium seasoning composition also may contain about 0.01% by weight of an iodide, particularly potassium iodide (KI) and about 1% by weight of a free-flow agent such as "Syloid" brand of silicon dioxide sold by E. T. Horn Co.

DESCRIPTION OF THE PREFERRED EMBODIMENTS

Sodium chloride has a molecular weight of 58.5 (atomic weight of Na=23.0), potassium chloride has a molecular weight of 74.5 (atomic weight of K=39.0) and magnesium sulfate has a molecular weight of 246.5 (atomic weight of Mg=24.3). Because potassium and magnesium have higher atomic weights than sodium, a mixture of their salts (within the weight percent ranges for each in accordance with the invention) results in weight percent figures for sodium, potassium and magnesium in the proposed low-sodium salt substitute (compared to table salt alone) as follows:

| % by Weight of NaCl, KCl, $MgSO_4.7H_2O$ and of Na, K and Mg | | | | | |
|---|---|---|---|---|---|
| Percent NaCl | Percent KCl | Percent $MgSO_4.7H_2O$ | Percent Na | Percent K | Percent Mg |
| 100 | 0 | 0 | 39.30 | 0.00 | 0.00 |
| 50 | 30 | 20 | 19.66 | 15.70 | 1.97 |
| 49 | 32 | 18 | 19.27 | 16.75 | 1.77 |
| 40 | 35 | 25 | 15.73 | 18.32 | 2.46 |

If one consumes 12 grams of table salt per day (current average level for the population of the U.S.A.) 4.72 grams of sodium is ingested. Consumption of 12 grams of the proposed low-sodium salt substitute (in its proposed formulation) would result in the ingestion of only 2.31 grams of sodium per day. Use of the salt substitute at the 12 grams per day level would also result in a desirable magnesium dietary supplementation of about 240 milligrams.

A surprising and unexpected taste result has been discovered with respect to low-sodium salt substitute compositions formulated of sodium chloride, potassium chloride and magnesium salts within the weight percent ranges of these compounds in accordance with the present invention. Although it has been known: to formulate a low sodium salt substitue composition comprised principally of sodium chloride and potassium chloride having a saltiness taste equivalent to sodium chloride alone; and to mask or overcome the bitterness or bitter after-taste of sodium-free potassium chloride salt substitutes with a small amount of magnesium salt, the formulation of the present invention (including minimums of at least 25% by weight of potassium chloride and at least 15% by weight of a magnesium salt) results in a synergistic or enhanced saltiness taste per unit weight while entirely masking any bitterness or bitter after-taste sensation otherwise expected as a result of the inclusion of potassium chloride. Thus, it has been found that only about 70 to 90% of the unit weight of table salt required to obtain a level of saltiness taste is required for the low-sodium salt substitute composition of the invention to obtain the same level of saltiness taste. This unexpected and unpredictable taste effect for the proposed low-sodium composition results in a further significant reduction of the amount of sodium intake via the composition as compared to the sodium intake for table salt where the desired saltiness taste effect or level is constant.

The compositions of the present invention are prepared by thoroughly mixing the components in the indicated proportions until a homogeneous product is attained. A substantially homogenous nonsegregating mixture results because the principal components, sodium chloride and potassium chloride are of similar crystalline structure (cubic) and have reasonably like specific gravities (NaCl=2.165; KCl=1.984). The third component, magnesium salt, is compatible with the NaCl and KCl salts in the mixture with respect to homogeneity and nonsegregativity. Magnesium sulfate and magnesium chloride salts have rhombic crystalline structure and specific gravity values of 1.68 and 1.569, respectively. The refractive indices of these salts are similar (NaCl=1.5442; KCl=1.490; $MgSO_4.7H_2O$=1.433; and $MgCl_2.6H_2O$=1.569) so that the individual crystals in admixture with each other look alike. The proposed low-sodium salt substitute composition: looks like table salt; pours, reposes and stores like table salt; and tastes like table salt.

Low-sodium salt substitutes of the present invention can be added to a wide variety of foods in favor-enhancing amounts. A flavor-enhancing amount depends on the particular taste of the user, the particular food and the particular effect desired. Generally, the amount of salt in foodstuffs varies from about 0.5% to about 4% by weight. In many commercially prepared foods salt or salt substitutes are added in amounts of from about 0.5% to about 1% by weight of the food. The low-sodium salt substitute and dietary supplement of the present invention can be added to any foodstuff where a salty taste is desired or expected, such as soups, mashed potatoes, juices, vegetables, meat, poultry, fish and the like.

The following examples include the actual data obtained from independently conducted paired comparison type taste testing of the low-sodium salt substitutes of the present invention, common table salt and the commercially available low-sodium salt substitute produced by Morton Salt Company and sold under the brand name "Morton's Lite Salt."

EXAMPLE I

Testing the low-sodium salt substitute composition of the present invention versus commercially available table salt in commercial instant mashed potatoes.

A low-sodium salt substitute composition in accordance with the present invention was subjected to paired preference and paired comparison (saltiness) taste testing, by a panel of 40 untrained judges, with respect to commercially available salt in the well accepted test medium of mashed potatoes. The commercially available salt (Morton's iodized salt) in the mashed potato composition constituted the "reference sample." The low-sodium salt substitute composition, comprised of: 49% by weight of sodium chloride; 32% by weight of potassium chloride; 18% by weight of magnesium sulfate; and 1% by weight of Syloid (free flowing agent), in a like mashed potato composition constituted the "test sample."

Betty Crocker brand potato buds were used to prepare the mashed potato samples for taste evaluation. Each treatment of mashed potatoes contained four cups of de-ionized water, two cups of milk (3.2% minimum fat, homogenized, pasteurized), and four cups of potato buds. No butter or margarine was used. For the sodium chloride treatment (reference samples) the recommended level of 1½ teaspoons of sodium chloride (iodized salt) was used. The reference treatment of mashed potatoes was made according to the following directions: heat the water, milk and salt as a mixture to boiling; remove the mixture from heat and stir in potato buds until just moistened; let stand until liquid is absorbed (about 30 seconds); and whip with fork until desired consistency. The reference treatment of mashed potatoes was held over a steam table to keep warm during the time required to serve. The test treatment of mashed potatoes containing the low-sodium salt substitute composition was prepared in like manner.

The paired preference and paired comparison (saltiness) taste testing by the 40 panelists was conducted in accordance with ASTM standard recommended practices for sensory evaluation of food products. All reference and test samples of mashed potatoes were coded and not otherwise identified to the panelists. For the paired preference test 20 of the judges indicated a preference for the "reference sample" (mashed potatoes with commercial salt) and 20 of the judges indicated a preference for the "test sample" (mashed potatoes containing the low-sodium salt substitute composition of the invention). For the paired comparison test 19 of the judges found the salt-containing reference sample to be "more salty" whereas 20 judges indicated that the low-sodium test sample was "more salty." One judge had no opinion as to which sample was "more salty." From the above taste testing results it can be stated with greater than 99% certainty that for the mashed potato samples compared there is no statistically significant difference in taste preference or in saltiness effect between a popular brand of common table salt and the low-sodium salt substitute composition of the present invention.

Before use of the common table salt and low-sodium salt substitute composition in the mashed potato treatments the common salt and low-sodium composition were dried at 100° C. for 4 hours. One and one-half teaspoons of the dry salt was found to weigh 9.3320 grams with the sodium content (39.316%) weighing a calculated 3.669 grams. One and one-half teaspoons of the dry low-sodium salt substitute composition was found to weigh 8.0145 grams with the sodium content (19.265%) weighing a calculated 1.544 grams. Thus, the relative sodium content of 1½ teaspoons of the salt substitute composition is 42.08% of the sodium content of 1½ teaspoons of the common salt.

EXAMPLE II

Testing the low-sodium salt substitute of the present invention versus commercially available table salt in tomato juice prepared from a commercially available unsalted tomato puree.

A low-sodium salt substitute composition in accordance with the present invention was subjected to consumer acceptance taste testing for "saltiness flavor" and for "overall desirability," by a panel of 35 untrained judges, with respect to commercially available salt in the well accepted test medium of tomato juice. The commercially available salt (Morton's iodized salt) in the tomato juice composition constituted the "reference sample." The low sodium salt substitute composition, comprised of: 49% by weight of sodium chloride; 32% by weight of potassium chloride; 18% by weight of magnesium sulfate; and 1% by weight of syloid (free flowing agent), in a like tomato juice composition constituted the "test sample."

Unsalted tomato juice samples were prepared by mixing unsalted S & W brand tomato puree with de-ionized water in a ratio of 1 part tomato puree to 3 parts water. For the sodium chloride treatment (reference samples) 1% by weight of the iodized salt was mixed into the prepared unsalted tomato juice. For the test treatment (test samples) 1% by weight of the low-sodium salt substitute composition was mixed into the prepared unsalted tomato juice. All reference and test samples of tomato juice were coded and not otherwise identified to the panelists.

Acceptance testing of the test samples versus the reference samples was based upon the rating of samples on the "Hedonic" scale as described by D. R. Peryam and F. J. Pilgram in their paper entitled "Hedonic Scale Method of Measuring Food Preferences," *Food Technology*, 11(9); 9–14, 1957. The Hedonic scale equates numerical values 1–9 to successive scale points at the "dislike" end of the scale to the "like" end of the scale. Thus, the samples (reference and test) were rated by each panelist or judge and "mean ratings" for the samples were developed and compared statistically.

The rating results of the 35 judge panel with respect to "saltiness flavor" showed a mean rating for the reference samples (tomato juice with common table salt added) of 6.66 and a mean rating for the test sample (tomato juice with the low-sodium salt substitute added) of 6.31. The rating results of the panel with respect to "overall desirability" showed a mean rating for the reference sample of 6.63 and a mean rating for the test sample of 6.20. From the above taste testing results it can be stated with greater than 99% certainty that for the tomato juice samples compared there is no statistically significant difference in "saltiness flavor" or "overall desirability" between common table salt and the low-sodium salt substitute composition of the present invention.

Before use of the common table salt and low-sodium salt substitute composition in the tomato juice treatments the common salt and low-sodium composition were dried at 100° C. for 4 hours and the weights of equal measures of each were carefully measured. One teaspoon of the dry salt was found to weigh 6.2727 grams whereas one teaspoon of the dry low-sodium salt substitute composition was found to weigh 5.0659 grams. The relative weights of the sodium content of each weighed amount of salt and salt substitute was 2.466 grams and 0.796 grams, respectively.

EXAMPLE III

Testing the low-sodium substitute of the present invention versus Morton's Lite Salt in tomato juice prepared from a commercially available unsalted tomato puree.

A low-sodium salt substitute composition in accordance with the present invention was subjected to consumer comparison taste testing for "saltiness flavor" and for "overall desirability," by a panel of 20 untrained judges, with respect to a commercially available low-sodium salt substitute in the well accepted test medium of tomato juice. The commercially available low-salt substitute was "Lite Salt" brand of low-salt manufactured and marketed by Morton Salt Co., Division of Morton-Norwich Products, Inc. under U.S. Pat. No. 27,981 (original U.S. Pat. No. 3,514,296) and comprised of 49.547% by weight of sodium chloride, 49.627% by weight of potassium chloride, and 0.826% by weight of other ingredients (referred to hereinafter as salt substitute "L"). The calculated percentage by weight of sodium in this product is 19.48% and the calculated percentage by weight of potassium is 25.98%. The low-sodium salt substitute composition in accordance with the present invention (referred to hereinafter as salt substitute "A") and used in the comparison taste testing comprised the composition described in Example II, above.

As in Example II, unsalted tomato juice samples were prepared by mixing unsalted S & W brand tomato puree with de-ionized water in a ratio of 1 part tomato puree to 3 parts water. For the salt substitute "L" treatment 1% by weight of substitute "L" was mixed with the prepared unsalted tomato juice. In like fashion 1% by weight of substitute "A" was mixed with the prepared unsalted tomato juice to obtain the salt substitute "A" treatment. All samples of tomato juice were coded and not otherwise identified to the panelists.

Comparison testing of substitute "A" samples vs. substitute "L" samples was based upon the rating of samples on the "Hedonic" scale. Thus, the samples were rated by each panelist or judge and "mean ratings" for the samples were developed. The rating results of the 20 judge panel with respect to "saltiness flavor" showed a mean rating for substitute "A" tomato juice of 7.05 and a mean rating for substitute "L" tomato juice of 6.70. The rating results of the panel with respect to overall desirability" showed a mean rating for substitute "A" tomato juice of 6.95 and a mean rating for substitute "L" tomato juice of 6.65. From the above comparison taste testing results it can be stated with greater than 99% certainty that for the tomato juice samples compared there is no statistically significant difference in the "saltiness flavor" or "overall desirability" between Morton's "Lite Salt" brand low-sodium salt substitute and the low-sodium salt substitute composition of the present invention.

The rating ballots for the foregoing comparison taste testing procedure asked the panelists to state their preference between the tomato juice samples being compared. Ten of the 20 judges indicated a preference for the juice containing the low-sodium salt substitute of the present invention (substitute "A" tomato juice). Of the remaining 10 judges, 5 indicated their preference for the juice containing Morton's "Lite Salt" brand of low-sodium salt substitute and the remaining 5 judges indicated no preference between the two samples. From the above preference selection results it can be stated with greater than 80% certainty that the panel's preference for substitute "A" tomato juice by 2 to 1 margin of judges over substitute "L" tomato juice was a matter of choice and not a matter of chance.

Although the low-sodium salt substitute compositions of the invention may contain as much as 50% by weight of NaCl, a reduction of sodium intake of more than 50% is achieved through use of the compositions because lower quantities of the substitute compositions yield the same saltiness taste effect.

The low-sodium salt compositions of the invention are formulated by intimately mixing the ingredients (40–50% by weight of NaCl, 25–35% by weight of KCl, and 15–25% of a magnesium salt), as relatively dry salt crystals of like size, by known methods. For example, the individual components may be independently ground to a suitable degree of fineness and then admixed in the dry state, or may be ground together in a mill. A wet method may be used in which the salt ingredients are dissolved and/or suspended in water, and the water thereafter removed by evaporation, as by spray drying or freeze drying. Each of these methods promotes substantially even distribution of the salt components within the compositions and prevents stratification and separation of the salt compounds having somewhat varying densities.

The product compositions of the invention can be utilized as a low-sodium condiment or dietary seasoning agent in place of ordinary table salt or bitter tasting salt substitutes in the cooking or meal-time flavoring of foods. The compositions may be added to processed foods during their preparation, canning or packaging, or aging as a replacement for salt. Also, in the case of food products where salt may not be normally added as an ingredient, suitable quantities of the compositions of the invention may be incorporated in order to introduce desired dietary supplementary quantities of magnesium and potassium.

While several particular embodiments of this invention have been described above, it will be understood that the invention is not to be limited thereto, since numerous modifications may be made, and it is contemplated, therefore, by the appended claims, to cover any such modifications as fall within the spirit and scope of this invention.

What we claim is:

1. A low-sodium seasoning composition adapted as a substitute for common table salt and as a magnesium dietary supplement comprising a homogeneous non-segregating mixture of like-sized crystal particles of: from about 40 to about 50% by weight of sodium chloride, from about 25 to about 35% by weight of potassium chloride, and from about 15 to about 25% by weight of a magnesium salt selected from the group comprising magnesium sulfate and magnesium chloride.

2. The low-sodium seasoning composition of claim 1 wherein the sodium chloride component of said composition comprises at least 45% by weight of said composition.

3. The low-sodium seasoning composition of claim 1 wherein the potassium chloride component of said composition comprises at least 30% by weight of said composition.

* * * * *